United States Patent
Powers et al.

(10) Patent No.: US 11,650,900 B2
(45) Date of Patent: May 16, 2023

(54) TRACKING DATA FLOW THROUGH DATA SERVICES USING A PROCESSING REQUEST IDENTIFIER IN CALLSTACK DATA

(71) Applicant: PAYPAL, INC., San Jose, CA (US)

(72) Inventors: Joshua Buck Powers, Chandler, AZ (US); Wesley Hummel, Phoenix, AZ (US); Matthew David Evens, Phoenix, AZ (US)

(73) Assignee: PAYPAL, INC., San Jose, CA (US)

( * ) Notice: Subject to any disclaimer, the term of this patent is extended or adjusted under 35 U.S.C. 154(b) by 25 days.

(21) Appl. No.: 17/317,208

(22) Filed: May 11, 2021

(65) Prior Publication Data
US 2021/0294718 A1    Sep. 23, 2021

Related U.S. Application Data

(63) Continuation of application No. 16/237,527, filed on Dec. 31, 2018, now Pat. No. 11,003,566.

(51) Int. Cl.
*G06F 11/34* (2006.01)
*G06Q 20/38* (2012.01)

(52) U.S. Cl.
CPC ...... *G06F 11/3476* (2013.01); *G06F 11/3471* (2013.01); *G06Q 20/389* (2013.01)

(58) Field of Classification Search
CPC ............. G06F 11/3476; G06F 11/3471; G06Q 20/389
USPC .......................................................... 714/45
See application file for complete search history.

(56) References Cited

U.S. PATENT DOCUMENTS

| | | |
|---|---|---|
| 2006/0005019 A1 | 1/2006 | Chao |
| 2017/0206116 A1 | 7/2017 | Reque et al. |
| 2017/0257456 A1* | 9/2017 | Vaish ............. H04L 43/08 |
| 2018/0060568 A1 | 3/2018 | Galenson et al. |
| 2019/0188578 A1* | 6/2019 | Manoharan ........ G06Q 20/4016 |

OTHER PUBLICATIONS

"The Libunwind Project," 2018, Retrieved from the internet: http://www.nongnu.org/libunwind on Dec. 28, 2018, retrieved using the WayBackMachine, from https://web.archive.org/web/20181228221609/http://www.nongnu.org/libunwind/, 1 Page.

* cited by examiner

*Primary Examiner* — Yair Leibovich
(74) *Attorney, Agent, or Firm* — Haynes and Boone, LLP

(57) ABSTRACT

There are provided systems and methods for tracking data flow through data services using a processing request identifier in callstack data. During processing requests with a service provider, each request is assigned a particular identifier, called a correlation identifier. The correlation identifier is stored in callstack data and may be used to map these individual data processing flows for the requests to the data processing services of the service provider used during the flows. Once the data flows are determined the actual used services may be identified. The mapping system may also provide for removal of erroneous callstack and reassembly of callstack data during asynchronous service calls. Additionally, the data flows may be used to see where multiple callstacks have divergent data flows. A service provider may utilize the data flows for determination of service usage rates.

20 Claims, 7 Drawing Sheets

FIG. 2A

```
{
  "@Subclasstype": "calrecordbean", "data":
  CI=B4247643",
  "duration": null,                              ← 1102
  "level": 3,
  "messageClass": "E14:51:10.71", "name":        ← 1104
  P",
  "status": "0",
  "type": "EXECP"
},
{
  "@Subclasstype": "calblockresponse",           ⎫
  calActivitesResp": [                           ⎬ — 1106
},                                               ⎭
{
  "@Subclasstype": "calrecordbean",              ⎫
  "data": "f7ccea1953e&raddr=userlifecycleserv-vip.live9.dcg11.slc.paypalinc.com:14316&laddr=10.16.222.12&content-
  ength=1743",                                   ⎪
  "duration": "200",                             ⎪
  "level": 2,                                    ⎬ — 1108
  "messageClass": "T14:51:10.92",                ⎪
  "name": "UserRead.2.0.load_user_data",         ⎪
  "status": "0",                                 ⎪
  "type": "SEND"                                 ⎪
},                                               ⎭
{
  "@Subclasstype": "calrecordbean",              ⎫
  "data": "CurrentPID=29753&ServerPool=userlifecycleserv:
  oad_user_data&CalThreadId=0&TopLevelTxnStartTime=16651caf80&Host=dcg11pegapads2026&pid=30134", ⎪
  "duration": null,                              ⎬ — 1110
  "level": 2,                                    ⎪
  "messageClass": "E14:51:10.92",                ⎪
  "name": "UserRead.2.0.load_user_data",         ⎪
  "status": "0",                                 ⎪
  "type": "SERVER_INFO"                          ⎪
},                                               ⎭
```
⎱ — 1100

```
- paymentserv: {                                          ← 200c
    - PaymentServ-1.0-auth: {                         ⎫
        avgDuration: 3.1632666666666664,              ⎪
        callCount: 15,                                ⎪
      - calls: {                                      ⎪
          + fulfillmentinternalserv: {…}  ⎤― 1204     ⎪
        },                                            ⎪
        countPerCall: 15,                             ⎪
        exampleId: "94d6267955b52",                   ⎪
      - tags: {                                       ⎬― 1200
          - paymentapiplatserv#TYPE: {                ⎪
              AUTHORIZE: 6   ← 1202                   ⎪
          },                                          ⎪
          - slingshotrouter-api#HTTP_PP_GEO_LOC:      ⎪
              US: 4                                   ⎪
          }                                           ⎪
        },                                            ⎪
        totalDuration: 47.449                         ⎭
    },
    - PaymentServ-1.0-pay: {                          ⎫
        avgDuration: 6.3335,                          ⎪
        callCount: 2,                                 ⎪
        countPerCall: 2,                              ⎪
        exampleId: "30aa8161cd999",                   ⎪
      - tags: {                                       ⎪
          - paymentapiplatserv#TYPE: {                ⎬― 1300
              SALE: 2   ← 1302                        ⎪
          },                                          ⎪
          - slingshotrouter-api#HTTP_PP_GEO_LOC:      ⎪
              US: 2                                   ⎪
          }                                           ⎪
        },                                            ⎪
        totalDuration: 12.667                         ⎭
    }
},
```

TRACKING DATA FLOW THROUGH DATA SERVICES USING A PROCESSING REQUEST IDENTIFIER IN CALLSTACK DATA

CROSS REFERENCE TO RELATED APPLICATIONS

This application is a continuation of U.S. patent application Ser. No. 16/237,527, filed Dec. 31, 2018, the content of which is hereby incorporated by reference in its entirety for all purposes.

TECHNICAL FIELD

The present application generally relates to mapping of data flow through data processing services of a service provider, and more specifically to utilizing a processing request identifier within callstack data to reassemble data processing flows through individual data processing services of a service provider.

BACKGROUND

Users may utilize communication devices to perform various actions, including use of user accounts to interact with online service providers. For example, a user may utilize a computing device to access a service provider's online platform, authenticate the user for use of an account, and/or perform electronic transaction processing using the account on the online platform. During interactions with the online service provider, the computing device may invoke certain data processing services provided by the service provider. Service providers may generally describe a flow through its services during data processing transactions based on predicted data flows and required services. However, individual user's actual interactions with the service provider may be significantly different. For example, a transaction may utilize different services based on the needs of specific users and groups of users. Thus, a service provider may not really know how data flows through the service provided by the service provider and which services are called and utilized during data processing transactions.

BRIEF DESCRIPTION OF THE DRAWINGS

FIG. 2A is an exemplary callstack data representation having missing data during mapping of data flows using a correlation identifier, according to an embodiment;

FIG. 2B is an exemplary callstack data representation having an asynchronous service call that may be reassembled using a correlation identifier and machine data within the callstack data, according to an embodiment;

FIG. 2C is an exemplary callstack data representation of two different tags that are split callstacks so that different flows may be viewed in the callstacks, according to an embodiment;

Figure 1:
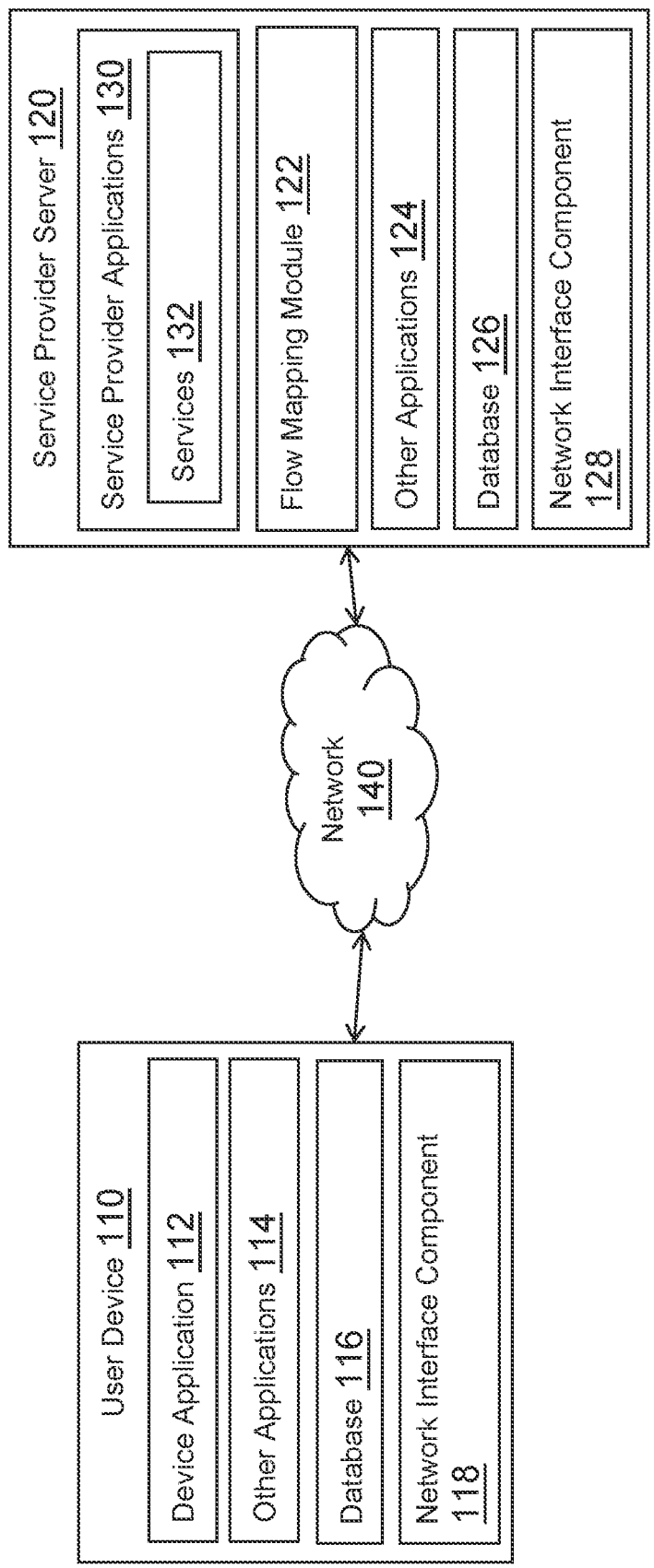
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for tracking data flow through data services using a processing request identifier in callstack data. Systems suitable for practicing methods of the present disclosure are also provided.

A user may interact with an online service provider system to perform some data processing transaction, such as accessing and/or authenticating use of an account, performing electronic transaction processing, or otherwise utilize the data processing services provided by the service provider. During interactions with a service provider for processing a transaction, many different actions may be taken and application programming interfaces (APIs) of different services may be called and communicated back and forth. However, the service provider may be unaware of how these services interact within the service provider's computing architecture and which services are called and utilized to process certain transactions. For example, a service provider may have thousands of different independent services where a transaction or other processing request utilizes multiple services during processing. For example, multiple APIs may require risk calls, database calls and/or writes, or other service calls. Thus, the service provider may be unaware of how service error or failure may affect data processing during future processing requests and which user groups utilize what services.

In order to provide for mapping of data flows through services of the service provider, each transaction or data processing request may be associated with a unique identifier referred to as a correlation identifier (ID). This correlation ID allows for tracking of the data processing transaction from the time it first hits the service provider's system (e.g., when a computing device first hits a website of the service provider) to completion of processing of the transaction. The service provider may assign the correlation ID to the particular transaction so that the correlation ID is stored in callstack data for the APIs of the service provider's system. The correlation ID is unique so that the processing request may be uniquely identified throughout its processing by the services of the service provider. Additionally, many processing requests may be tracked by accessing a large volume of callstack data for the individual services and comparing callstack data.

In this regard, one or more correlation IDs may be examined to determine data flows through the services of the service provider. Callstack data from the individual services and APIs may be retrieved from stored data. The call stacks may include the correlation IDs, and further include information on service calls made by each service's API. Thus, the callstack data may examine how data flows through the services of the service provider and what services interact for data processing. A correlation ID may be identified in the callstack data and the service calls by the services may be tracked to determine when the correlation ID enters the service provider system and when the correlation ID is completed with data processing and making service call requests. This may be reconstructed using the callstack data, including timestamps, service calls, and other callstack data. This may occur for several correlation IDs, such as thousands or more correlation IDs in order to map data flows and uses of the services of the service provider during transaction processing. The data flows may be used to determine common flow patterns based on particular types of data processing requests and activities on the service provider. For example, the data flows may be added up to determine how correlation IDs move through the system and how services are connected. Additionally, the service provider may determine which services are used by data processing products and components of the service provider.

After determination of data flows for data processing between services of the service provider, the service provider may provide usage statistic and rates to the service provider services. For example, based on a certain data processing product or feature of the service provider, the service provider may determine the most used and/or rates/percentage of use of services during the particular data processing. In this regard, a payment or transaction processing product provided to users by the service provider may utilize certain services over other ones in a certain percentage of times or for certain data processing of the payment. Thus, the service provider may determine usage rates of services to identify those services being used commonly, rarely, or not at all, which may be specific to the particular data flow and/or data processing request (e.g., payment, authentication, account creation, etc.). The determination of the particular service usage statistics for certain data flows and/or data processing products may also be specific to certain user groups (e.g., based on income, nationality, language, etc.) and/or based on geographical regions (e.g., cities, states, countries, etc.). In some embodiments, the service usage rates may also be particular to other groupings of users and/or based on the parameters of the incoming data for the processing requests (e.g., payment, transaction, etc.).

The service provider may also flag certain services for review, maintenance, and/or monitoring based on the usage statistics. For example, if a service is rarely used or never used, the service may be designated for review and/or removal from the service provider's system to free processing and memory availability and provide additional computing resources for other services. The services that are commonly or highly used and/or shared between multiple data flows may also be designated so that if the service goes offline, the service provider may be able to determine the effects on the service provider's data processing products. This may also be highlighted based on the particular user groups (e.g., nationality) so that if a service goes offline, the effects in a particular group of users may be easily seen and compared to a global effect of the service going offline for all users of the service provider. In some embodiments, the actual mapped data flows may be compared to expected data flows or those data flows of service use that an administrator of the service provider system has designated for a particular data processing request or data product of the service provider. Thus, the actual flows may be used to show the divergence from the expected flow of data through the service provider's services to determine how actual data processing occurs versus expected data processing.

In some embodiments, prior to processing the callstack data to determine data processing flows, reassembly and/or removal of some callstack data may be required. For example, erroneous callstacks that are missing data may be removed. For example, some log data may be missed during logging of call stack data when processing one or more requests. A central application logger may attempt to combine separate callstacks, which results in faulty data. This may occur due to an interrupt, memory loss or an issue, or other computing error. When this occurs, a data aggregator may be used to programmatically find stacks with missing data and exclude from the system so that the data is not processed. The data aggregator may identify those with missing data based on one or more of timestamp gaps in the callstack data log, comparing a starting transaction to a final ending transaction (e.g., a starting transaction ID to an ending transaction ID), and/or statistically removing longer transactions. Where there are timestamp gaps, the callstack log may show a reported processing time that does not match timestamps within the log that shows a difference in time during transaction processing. For example, a reported processing time may be seven seconds, while a timestamp log shows five minutes between the starting data processing transaction and the ending action or transaction. In some embodiments, the starting transaction may be labelled differently than the ending transaction, which would not be valid. Thus, if the comparison shows different transactions logged in the callstack, the callstack data may also be excluded. Finally, if the callstack data reports a statistically longer than average data processing time, such as seven seconds which would place the transaction in the top 1% of all data processing times, the callstack data may be removed. The statistically normal range may be averaged for all transactions, and the data aggregator may remove those that fall within a certain percentage or outside of a number of standard deviations for the average.

In some embodiments, callstack data may be required to be reassembled when an asynchronous service call is made by one service's API to another service. For example, synchronous services calls occur when a service calls another service and waits for a response. In contrast, an asynchronous service call may occur when a service requires data from multiple places and/or services and the service calls the other but does not wait for a response. This can cause the logging to become detached such that the callstack hierarchy does not have complete data. In order to provide asynchronous reassembly, an identifier used for the asynchronous call made be added to the callstack and be identified with an IP address and correlation ID for the service call. The missing data from a response part of the callstack may identify the asynchronous service call. Within the callstack, additional data may designate an IP address and a service device or server (e.g., machine running the service) called by the calling service for the asynchronous service call. The root transaction data for the API called may then be examined to determine processes executed by the machine running the service. Thus, the machine and thread running on the machine may be compared between the calling and called services in order to reassemble the asynchronous service call's callstack data. Additional data may also be compared, such as timestamps, that may assist in identifying the root data from the called API.

In some embodiments, the callstack data for particular transactions may be analyzed through the correlation IDs to determine multiple pathways for data flow. For example, an API may be called during a data processing transaction, where the transaction may go through divergent data flows depending on the parameters and particular data sent through. Callstacks may be filtered depending on the specific parameters and other metadata stored on nodes so that tags within callstacks can be used to identify differences in data flows based on the data with those payment flows' callstacks. For example, a data flow through an API may include a "SALE" callstack and an "AUTHORIZE" callstack for payment sales and authentications, respectively. By analyzing the different tags, called service IDs, country information, transaction types, or other data within the callstack, a data aggregator used to process the callstack data may identify differences in data flows through the API based on the called services.

In this manner, a service provider may generate data flows that track use of services during processing of transactions in order to rebuild the usage of services as performed by the service provider. This allows the service provider to determine how data flows through the service provider's systems and which data processing services are invoked for particular transactions and other processing requests. The use of services may also be grouped by regions, user groups, and other metadata so that the service provider may analyze service usage by particular trends in transaction metadata. Moreover, a service provider may optimize performance and computing resource availability of the service provider's systems by identifying the important services for monitoring and removing services that are unused or underutilized. The service provider may then know how services are used on the live service provider in order to fix issues with data processing and service interactions.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user device 110 and a service provider server 120 in communication over a network 140. A user (not shown) may utilize user device 110 to utilize the various features available for user device 110, which may include processes and/or applications that may interact with services provided by service provider server 120 to process data. Service provider server 120 may therefore generate a transaction based on a data processing request, where the transaction includes callstack data from the APIs of various called or invoked services. The transaction may be assigned a unique identifier, or a correlation ID, which may be used to track the call stack data and map the transaction through the called services. Service provider server 120 may therefore rebuild a data flow of called services for the transaction, which may be collected with other data flows to determine service usage on service provider server 120 by various tasks.

User device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

User device 110 may be implemented as a communication device that may utilize appropriate hardware and software configured for wired and/or wireless communication with service provider server 120, which may include personal and mobile computing devices of individual and/or groups of customers of service provider server 120, such as single users, merchants, and/or other entities. For example, in one embodiment, user device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 110 of FIG. 1 contains a device application 112, other applications 114, a database 116, and a network interface component 118. Device application 112 and other applications 114 may correspond to executable processes, procedures, and/or applications with associated hardware. In other embodiments, user device 110 may include additional or different modules having specialized hardware and/or software as required.

Device application 112 may correspond to one or more processes to execute software modules and associated devices of user device 110 to send, receive, and/or process data with service provider server 120, for example, by accessing a website or other online platform of service provider server 120 and request data processing through one or more services of service provider server 120. In this regard, device application 112 may correspond to specialized hardware and/or software utilized by a user of user device 110 to access service provider server 120, requesting data processing, and proceeding through one or more data flows that utilize services of service provider server 120. Thus, device application 112 may provide one or more convenient interfaces capable of displaying data and processes accessible from service provider server 120. In some embodiments, device application 112 may permit a user to browse information available over network 140 including accessing webpages, entering information from webpages, and navigating websites through webpages, and providing posts or messages through websites and online platforms. In certain embodiments, device application 112 may be implemented as a web browser configured to view information available over the Internet or access a website of a website provider. For example, device application 112 may be utilized to access websites and engage in online actions with service provider server 120. In other embodiments, device application 112 may be a dedicated application used for message exchange and/or posting.

For example, device application 112 may correspond to a device application, which may be utilized to perform various online and/or virtual actions, including messaging, electronic transaction processing, merchant shopping and purchasing, social networking, and other types of electronic actions. For example, device application 112 may correspond to Internet browsers (e.g., browser histories and online interactions), Internet search engines, social networking applications, microblogging applications, merchant and shopping applications, mapping applications, or other types of device applications that may be utilized to interact with service provider server 120. In some embodiments, transaction processing may be performed through device application 112. During transaction processing, device application 112 may be utilized to select payment instrument(s) for use in providing payment for a purchase transaction, transfer, or other financial process and enter a payment or electronic transaction processing flow with service provider server 120. As discussed herein, device application 112 may utilize user financial information, such as credit card data, bank account data, or other funding source data, as a payment instrument when providing payment information. Additionally, device application 112 may utilize a digital wallet stored with an account with a payment provider, such as service provider server 120, as the payment instrument, for example, through accessing a digital wallet or account of a user with service provider server 120 through entry of authentication credentials and/or by providing a data token that allows for processing using the account. Device application 112 may be used to enter and/or receive transaction data, including a merchant, merchant device, merchant location, or other identifier, which may be processed through a data flow with service provider server 120.

In various embodiments, user device 110 includes other applications 114 as may be desired in particular embodiments to provide features to user device 110, for example, those applications, processes, and/or features that may not be provided by device application 112. For example, other applications 114 may include security applications for implementing client-side security features, programmatic client applications for interfacing with appropriate application programming interfaces (APIs) over network 140, or other types of applications. Other applications 114 may include device interfaces and other display modules that may receive input from the user and/or output information to the user. For example, other applications 114 may contain software programs, executable by a processor, including a graphical user interface (GUI) configured to provide an interface to the user. Other applications 114 may therefore use components of user device 110, such as display devices capable of displaying information to users and other output devices.

User device 110 may further include database 116 stored on a transitory and/or non-transitory memory of user device 110, which may store various applications and data and be utilized during execution of various modules of user device 110. Thus, database 116 may include, for example, identifiers such as operating system registry entries, cookies associated with device application 112 and/or other applications 114, identifiers associated with hardware of user device 110, or other appropriate identifiers, such as identifiers used for payment/user/device authentication or identification, which may be communicated as identifying user device 110 to service provider server 120. Database 116 may include data processed with service provider server 120 by one or more services through a data flow.

User device 110 includes at least one network interface component 118 adapted to communicate with service provider server 120. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Network interface component 118 may communicate directly with nearby devices using short range communications, such as Bluetooth Low Energy, LTE Direct, WiFi, radio frequency, infrared, Bluetooth, and near field communications.

Service provider server 120 may be maintained, for example, by an online service provider, which may provide payment and other data processing features to users through implemented services of service provider server 120. In this regard, service provider server 120 includes one or more processing applications which may be configured to interact with user device 110 and/or another device/server to facilitate data processing transactions. In one example, service provider server 120 may be provided by PayPal®, Inc. of San Jose, Calif., USA. However, in other embodiments, service provider server 120 may be maintained by or include another type of service provider, which may provide the aforementioned services to a plurality of users.

Service provider server 120 of FIG. 1 includes service provider applications 130, a flow mapping module 122, other applications 124, a database 126, and a network interface component 128. Service provider applications 130, flow mapping module 122, and other applications 124 may correspond to executable processes, procedures, and/or applications with associated hardware. In other embodiments, service provider server 120 may include additional or different modules having specialized hardware and/or software as required.

Service provider applications 130 may correspond to one or more processes to execute software modules and associated specialized hardware of service provider server 120 to provide services 132 to users for data processing transactions generated when the users use one or more of services 132 through a data flow with service provider applications 130. In some embodiments, service provider applications 130 may provide payment and transfer services to the users through services 132, for example though a payment account and/or payment instruments. In this regard, service provider applications 130 may correspond to specialized hardware and/or software to provide payment services and payment accounts through services 132, including digital wallets storing payment instruments. Services 132 may allow for a payment to a user and/or merchant through a payment instrument, including a credit/debit card, banking account, payment account with service provider server 120, and/or other financial instrument. In order to establish a payment account for a user to send and receive payments, services 132 may receive information requesting establishment of the payment account. The information may include user personal and/or financial information. Additionally, the information may include authentication information, such as a login, account name, password, PIN, or other account creation information. The user may provide a name, address, social security number, or other personal information necessary to establish the account and/or effectuate payments through the account. Service provider applications 130 may further allow the user to use services 132 and maintain the payment account, for example, by adding and removing payment instruments. In order to perform transaction processing and/or payments, service provider applications 130 may utilizes services 132 to receive and/or generate payment transaction data and process the data through services 132. Services 132 may also be used to debit an account of the user and provide the payment to an account of the merchant or other user. Service provider applications 130 may also be used to provide transaction histories for processed transactions.

Flow mapping module 122 may correspond to one or more processes to execute software modules and associated specialized hardware of service provider server 120 to determine data processing flows using services 132 based on unique identifiers (e.g., correlation IDs) assigned to data processing transactions when the transactions enter the system of service provider applications 130. In this regard, flow mapping module 122 may correspond to specialized hardware and/or software to map data flows using correlation IDs within callstack data. For example, as a transaction is first initiated with service provider applications 130 for processing, a correlation ID may be assigned to the transaction, and callstack data generated by APIs of services 132 may store the correlation IDs with data associated with processing the transaction. Flow mapping module 122 may utilize the correlation IDs to map data flows by accessing the callstack data and determine one or more of services 132 used to process the transaction, and the order of use of services 132, using the correlation IDs.

Flow mapping module 122 may then output one or more data flows based on mapping those data flows through services 132 using the correlation IDs. Flow mapping module 122 may then be used to perform one or more actions based on the mapped data flows. For example, usage rates and statistics may be output based on usage of services 132 by particular data flows, regions, and/or user groups. This may be utilized to highlight services that have high and/or low usage rates for service, maintenance, monitoring, and/or removal. Additionally, flow mapping module 122 may be used to determine the difference or the delta between an expected flow for a data processing product of service provider server 120 and the actual data flow determined by flow mapping module 122. Flow mapping module 122 may be used to determine changes in flows using services 132 over time, such as if a service becomes more or less used for a particular product's data flow over time.

Flow mapping module 122 may also provide processes to handle erroneous or missing data, as well as detect differences in callstack data for an API based on differences between usage of services 132. For example, flow mapping module 122 may be used to detect when call stack data is erroneous and missing data by checking timestamps gaps and reported API usage times, comparing starting transactions with final transactions, and/or removing transactions having callstack data that exceeds a statistical or threshold amount (e.g., are in the top 1% of all processing times). Flow mapping module 122 may also provide asynchronous reassembly of callstack data by detecting asynchronous service call identifiers and matching the box's (machine running the service) data from one callstack to other callstacks. For example, in a log view, flow mapping module 122 may be able to review data entry for the asynchronous call by the calling service and determine the called service through the root transaction's data entry having the identifier of the machine, thread, API call, and other data. Flow mapping module 122 may also detect multiple callstacks in an API that have different processing flows through the metadata attached to nodes and within transactions that differ based on the called services and transaction processing. The processes to detect particular callstack data for processing is discussed in further detail in reference to the exemplary callstacks shown in FIGS. 2A-C.

In various embodiments, service provider server 120 includes other applications 124 as may be desired in particular embodiments to provide features to service provider server 120. For example, other applications 124 may include security applications for implementing server-side security features, programmatic client applications for interfacing with appropriate application programming interfaces (APIs) over network 140, or other types of applications. Other applications 124 may contain software programs, executable by a processor, including a graphical user interface (GUI), configured to provide an interface to the user when accessing service provider server 120, where the user or other users may interact with the GUI to more easily view and communicate information. In various embodiments, other applications 124 may include connection and/or communication applications, which may be utilized to communicate information to over network 140.

Additionally, service provider server 120 includes database 126. As previously discussed, a user may establish one or more digital wallets and/or payment accounts with service provider server 120. Digital wallets and/or payment accounts in database 126 may include user information, such as name, address, birth date, payment instruments/funding sources, additional user financial information, user preferences, and/or other desired user data. Users may link to their respective digital wallets and/or payment accounts through an account, user, and/or device identifier. Thus, when an identifier is transmitted to service provider server 120, e.g., from user device 110, one or more digital wallets and/or payment accounts belonging to the users may be found. Database 126 may also store callstack data generated by APIs of services 132 during processing of data transactions with service provider server 120. The call stack data may include unique correlation IDs assigned to the transactions, and callstack data may be mapped to generate data flows through services 132

In various embodiments, service provider server 120 includes at least one network interface component 128 adapted to communicate user device 110 over network 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2A:
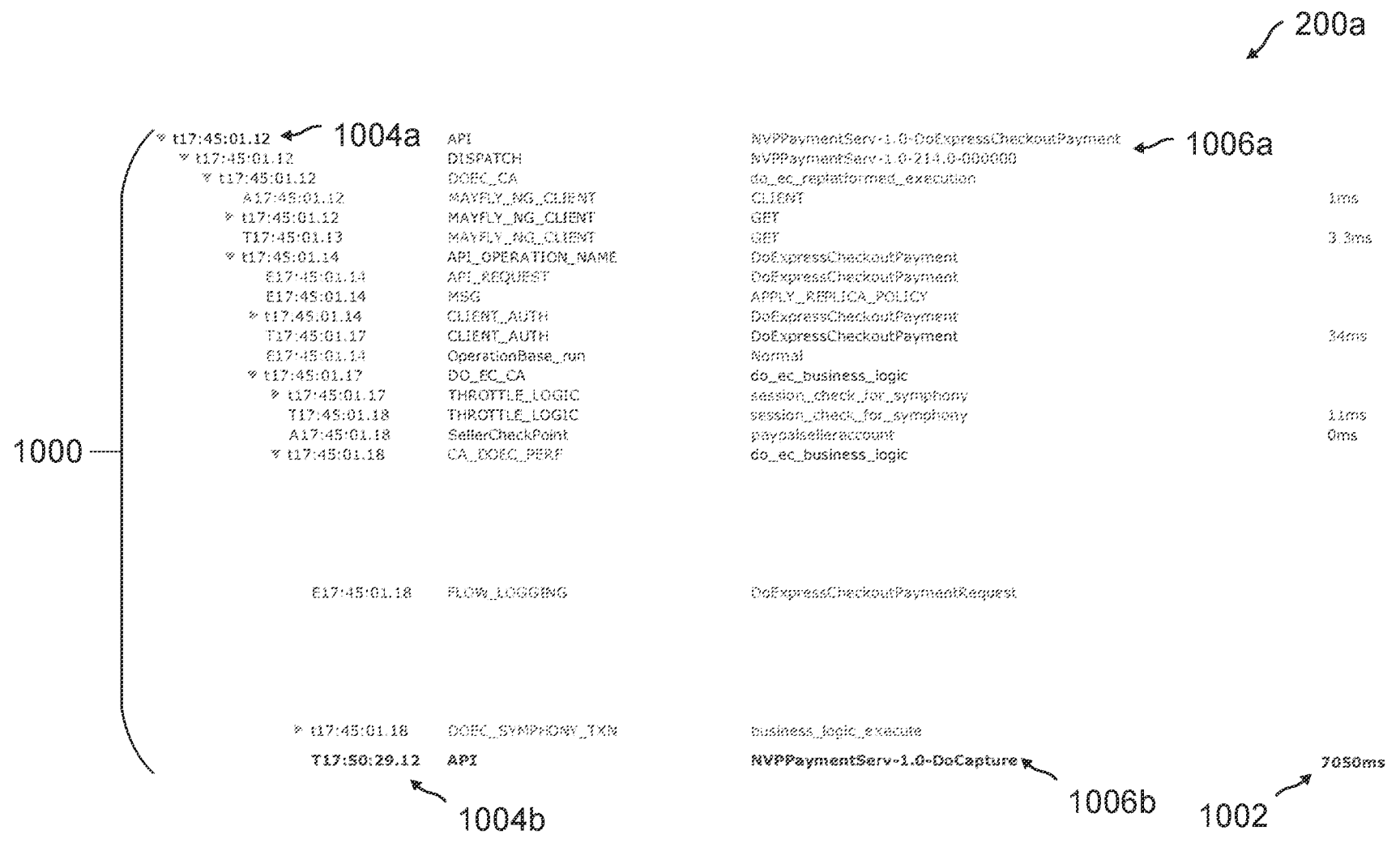

FIG. 2A is an exemplary callstack data representation having missing data during mapping of data flows using a correlation identifier, according to an embodiment. Environment 200a of FIG. 2A displays callstack data that is erroneous due to a computing error at the time of data logging for the callstack, such as a memory error, interrupt, or the like. In this regard, callstack 1000 is required to be detected and omitted from mapping by a data flow determination process, such as flow mapping module 122 in system 100 of FIG. 1.

Callstack 1000 is shown with various data that may be used to detect whether callstack 1000 is erroneous due to missing data. For example, callstack 1000 may be retrieved using a correlation ID and may be desirable to be mapped based on the correlation ID. In Callstack 1000, a report time 1002 is shown that displays a report during use of the API by a data aggregator or logger, such as a central application logger. Callstack 1000 also displays timestamps having an initiation time 1004*a* and an ending time 1004*b*. Finally, callstack 10000 also includes a starting transaction label 1006a and an ending transaction label 1006b.

In order to detect that callstack 1000 is erroneous, first reported time 1002 may be compared to the total time for initiation time 1004a and ending time 1004b. Reported time 1002 is shown as about 7 seconds, while the time differential between initiation time 1004a and ending time 1004b shows about 5 minutes. Since these times are significantly different, which may include applying a configurable buffer to allow for variations, callstack 1000 may be eliminated due to the significant difference between reported time 1002 and the time between initiation time 1004a and ending time 1004b. In a second embodiment, starting transaction label 1006a and ending transaction label 1006b are shown as different transactions. In order to be valid, the transaction should be the same. Thus, callstack 1000 may be eliminated. In a third embodiment, the reported time 1002 is shown as 7 seconds, which may be significantly longer than the average transaction time. Thus, callstack 1000 may be removed as being statistically longer than the average transaction time.

FIG. 2B is an exemplary callstack data representation having an asynchronous service call that may be reassembled using a correlation identifier and machine data within the callstack data, according to an embodiment. Environment 200b of FIG. 2B displays callstack data that may be determined and processed in order to identify callstack data under another service to provide asynchronous reassembly of logging data.

In environment 200b, callstack 1100 includes exemplary data taken from a callstack that may be used to determine a called service by a calling service during an asynchronous service call. The asynchronous service call may occur when a service calls another service but does not wait for a reply and thus no responsive data is stored to the callstack with the asynchronous service call. Callstack 1100 is shown with a correlation ID 1102 that may be used to track a transaction during processing by one or more services of a service provider. A service presently processing the transaction may make an asynchronous service call that is identified using async call identifier 1104 with async response callblock 1106 that is missing response data.

In order to determine the called service and retrieve data for the called service, further down in the callstack, box data 1108 that identifies the called box or machine may be found. Box data 1108 allows for determination of the called machine, but may not further inform the system of the process that was called. Thus, further down, process data 1110 may be found, which may then provide the necessary information to determine the called service. Once the aforementioned box data 1108 and process data 1110 is determined, the called service may be determined and root transactions may be processed to determine a match with the aforementioned data. Once the match is found, the service that was called may be moved under or added to the callstack data having the missing service call due to the asynchronous service call.

FIG. 2C is an exemplary callstack data representation of two different tags that are split callstacks so that different flows may be viewed in the callstacks, according to an embodiment. Environment 200c of FIG. 2C displays callstack data that shows a split in the callstack between different data flows that may be identified using metadata tags within the callstack (e.g., based on metadata on nodes within the service).

For example, within environment 200c, two different iterations of the callstack data show divergent data processing flows based on the particular data parameters that go through an API. In this regard, callstack 1200 includes an authorize tag 1202 that occurs when a transaction proceeds through an authorize data flow, such as to authorize and/or authenticate a user for transaction processing. During callstack 1200 data flow for authorize tag 1202, a service call 1204 to a "fulfillmentinternalserv" is also present. Thus, callstack 1200 includes service call 1204 that is not found in a callstack 1300. Callstack 13000 includes a sale tag 1302 that may occur when processing a sales transaction, where sale tag 1302 differs from the product provided with authorize tag 1202. Thus, although callstack 1200 and callstack 1300 may occur under the same API, callstack 1200 and callstack 1300 may display divergent data processing flows that may identify different data flows for products based on their corresponding tags.

Figure 3:
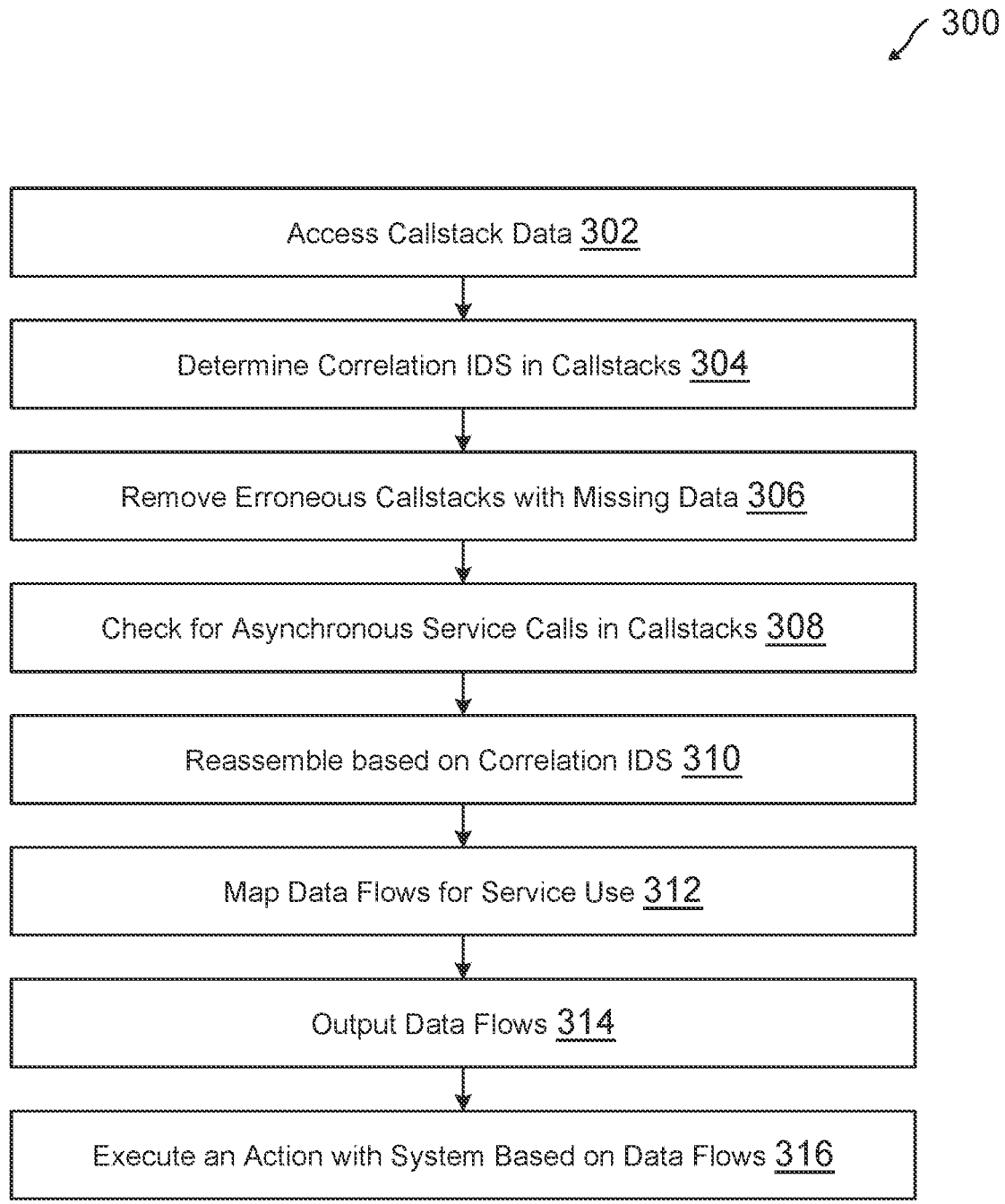
FIG. 3 is a flowchart of an exemplary process for mapping data flows using service provider system services through a correlation identifier in call stack data, according to an embodiment.

FIG. 3 is a flowchart of an exemplary process for mapping data flows using service provider system services through a correlation identifier in call stack data, according to an embodiment. Note that one or more steps, processes, and methods described herein of flowchart 300 may be omitted, performed in a different sequence, or combined as desired or appropriate.

At step 302 of flowchart 300, callstack data is accessed for a service provider system and the APIs of the services of the service provider system. The callstack data may include information associated with data processing transactions performed by the service provider system from requests by users to utilize products and features provided by the service provider system, such as an account, authentication, payment, or transfer product. Using the callstack data, correlation IDs are determined from the callstacks and/or identified by the system for transactions that are desirable to be tracked to determine data flows, at step 304. These correlation IDs may be stored to the callstacks and may be used to track how a transaction is processed through the APIs of the service provider system's services. The correlation IDs may therefore be used to generate data flows for processing products provided by the service provider.

Prior to determining data flows, the service provider system may be required to remove and/or reassemble callstack data that has missing elements. Thus, at step 306, erroneous callstacks with missing data are removed. These erroneous callstacks may be identified through reported processing times within an API as exceeding an average or being within a statistically longer time than the average. These may also be removed by determining that the transaction label differs from start to end of the processing or if the reported time does not compare to the difference in the timestamps and/or the timestamps reported processing times. At step 308, asynchronous service calls in call stacks are determined based on asynchronous identifiers in the callstack data and missing data from responses to service calls. The asynchronous data is reassembled, at step 308, by examining the callstack data to determine machine and process identification data. Once those are determined by examining the callstack in the calling API, the called service's API may be identified and may be moved into the missing callstack data for the calling service.

At step 312, data flows for service use are mapped using the callstack data and the correlation IDs. For example, the services called and utilized during data processing for a particular correlations ID may be identified and the order and/or flow through the services may be determined. The data flows may therefore identify how data is processed by the service provider's services and how the APIs of those services interact to process data. The data flows may also be associated with particular data parameters that are processed, which may be identified based on tags or metadata on nodes of the services. Thus, the data flows may be used to identify how particular products and features process data. The data flows are output, at step 314, to one or more users, such as an administrator of the service provider system. The output of the data flows may be associated with the particular products and features provided by the service provider so that the administrator may view the actual usage of services by particular products. Additionally, one or more actions are executed with the system based on the data flows, at step 316. This may include determining whether the actual flows match expected flows and determining the difference, highlighting one or more flows based on usage rates, and/or monitoring the data flows over time to detect differences, as discussed in reference to FIG. 4.

Figure 4:
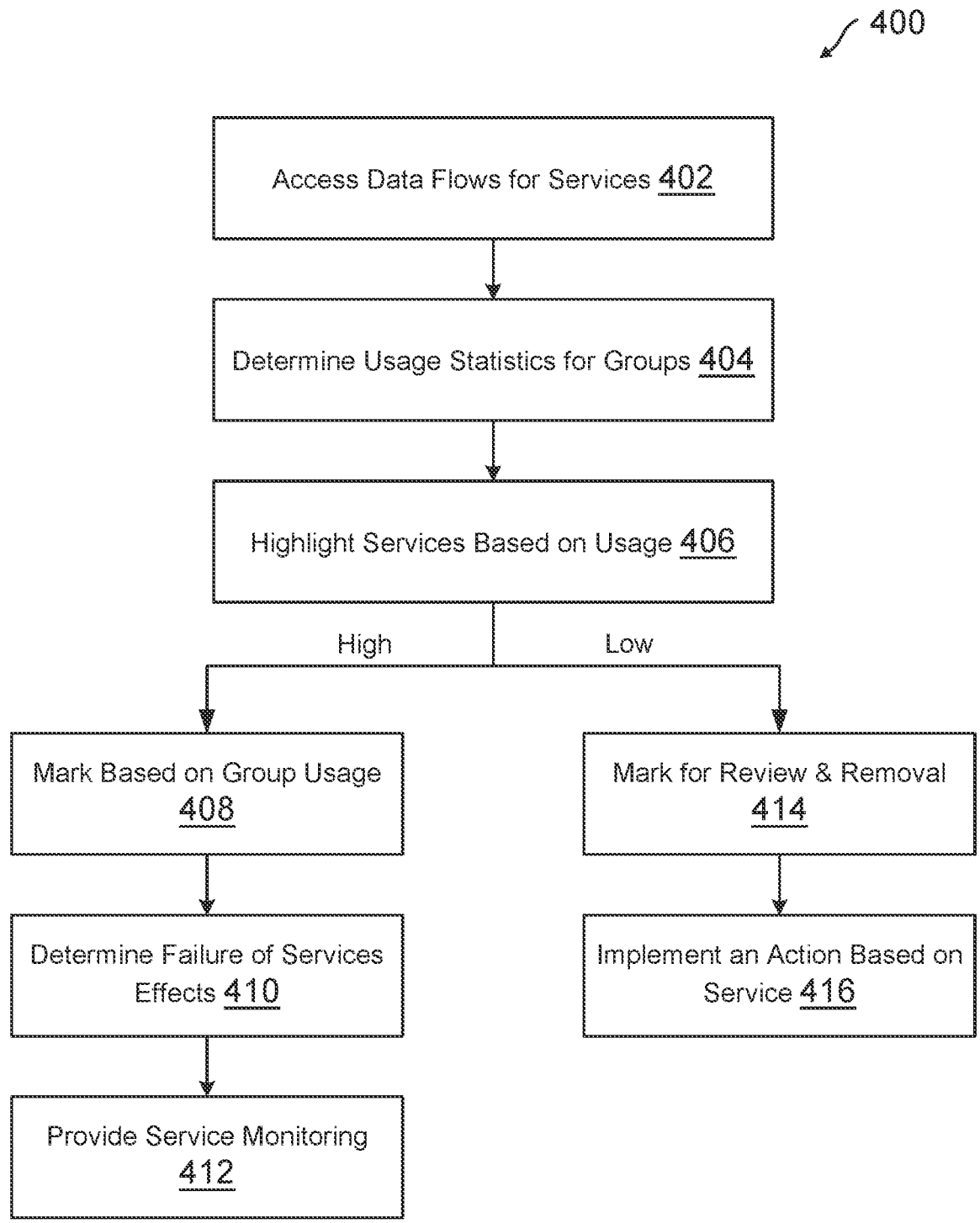
FIG. 4 is a flowchart of an exemplary process for use of data flows to determine service usage by a service provider system, according to an embodiment.

FIG. 4 is a flowchart of an exemplary process for use of data flows to determine service usage by a service provider system, according to an embodiment. Note that one or more steps, processes, and methods described herein of flowchart 400 may be omitted, performed in a different sequence, or combined as desired or appropriate.

At step 402 of flowchart 400, the data flows for services are accessed, for example, based on the data flows determined in FIG. 3. The data flows may be accessed with additional data, such as a number of the data flows that utilize the same or similar services, data flows for the same or similar products that may utilize different services, which may be dependent on user groups, regions, or other parameters (e.g., if a certain region performs payment or authentication processes through a certain service over another service), and other data. This allows the system to determine usage statistics for groups of services, which may be particular to certain data flows and products/features of the service provider, at step 404. The usage statistics may be used to determine what services are used for particular data flows and/or products. The usage statistics may also identify service use, which may be particular to certain data flows and/or products, by their use for user groups, regions, or other information.

At step 406, services are highlighted based on usage. The highlighted services may be highlighted based on being above or below a certain threshold or being statistically different from an average usage rate (e.g., within a top or bottom percentage or different by a set amount). If the service is highlighted based on high usage, flowchart 400 may proceed to mark the service based on the group usage, such as by the locality or type of users utilizing the service. The system may further determine failure effects of the service, at step 410, which may be used to highlight potential effects on the service provider system due to failure of the service. Additionally, service monitoring may be provided, at step 412, to monitor whether changes to the service and/or data flow may occur and affect data processing by the data flows. In some embodiments, the monitoring may also monitor change in use of the service over time based on changes to data flows within the service provider. In contrast, if the service is highlighted due to low usage, the service is marked for review, at step 414. The service may be highlighted for review based on removal of the service and/or updating within the system. For example, an action is executed with the service, at step 416, which may be updating the service so that it is utilized in more data flows or removing the service so that processing resources may be freed.

Figure 5:
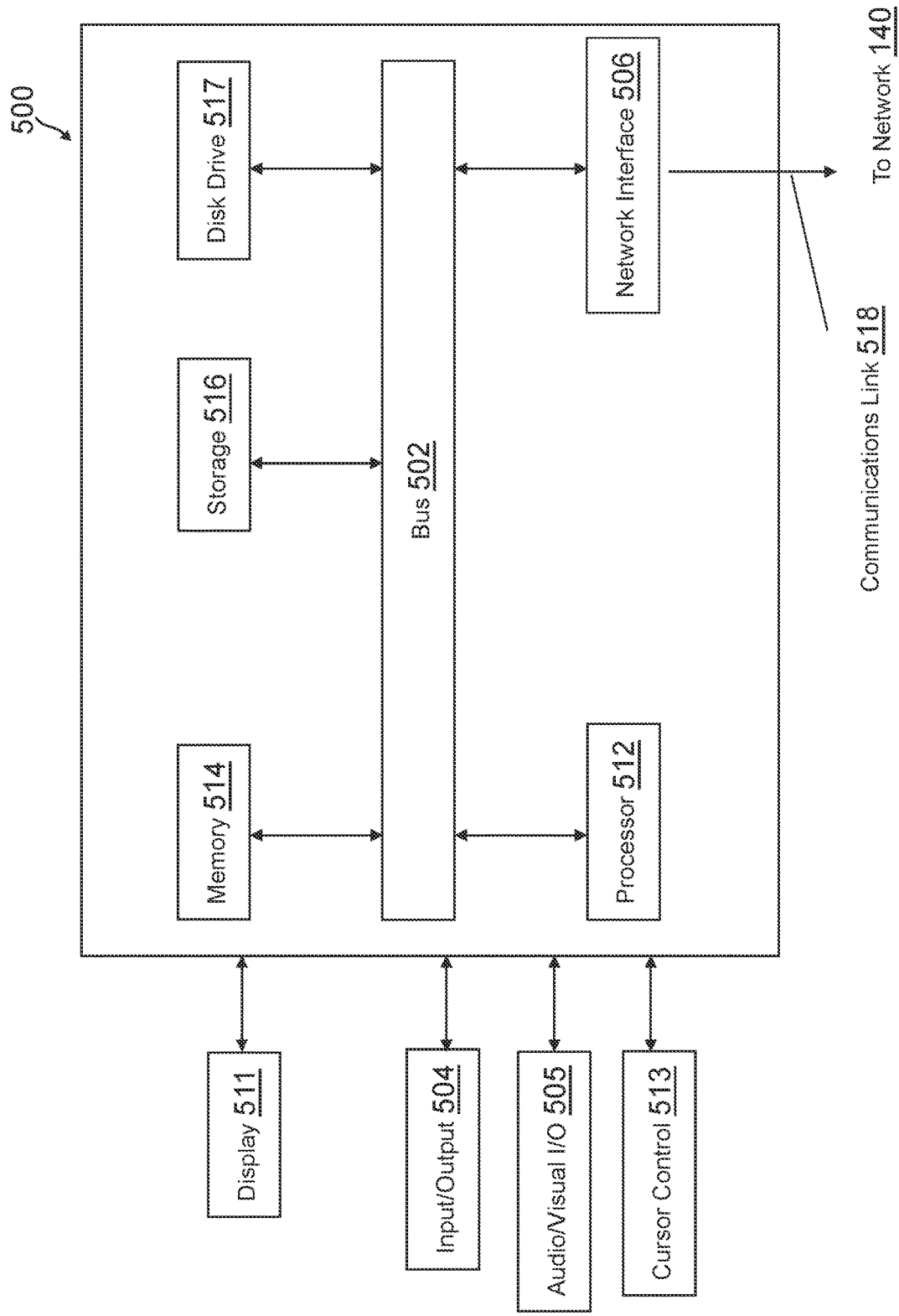
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for mapping service calls through callstacks, the method comprising:
   accessing correlation identifiers (IDs) for each transaction of a group of related transactions processed by a service provider, each of the correlation IDs corresponding to a respective unique transaction of the group of the related transactions, each of the transactions initiated by a respective originating entity of a plurality of originating entities;
   determining, based on the correlation IDs, mappings of callstack data for first executions of the group of the related transactions, the mappings indicating service dataflows through one or more callstack(s), the callstack data indicating a plurality of Application Programming Interfaces (APIs) used to invoke a plurality of services;
   determining, based on the service dataflows, the plurality of services invoked during the processing of the related transactions; and
   determining, based on the mappings of the callstack data, one or more characteristics of processing of the group of the related transactions as related to the plurality of services.

2. The method of claim 1, wherein the one or more characteristics comprise a flow pattern for the plurality of services as related to the plurality of originating entities.

3. The method of claim 1, wherein the one or more characteristics comprise a usage rate of the plurality of services by the originating entities, wherein the usage rate is determined based on use of the service dataflows by the plurality of originating entities.

4. The method of claim 1, further comprising:
   determining one of the services exceeding a threshold usage rate for a region as compared on a usage rate of the services, wherein the one or more characteristics comprise the usage rate; and
   notifying a system administrator of the one of the services exceeding the threshold usage rate.

5. The method of claim 1, further comprising:
   determining that one of the callstack(s) is missing data based on at least one timestamp associated with at least one of the callstack(s) or a time duration of at least one of the one of the callstack(s) exceeding a threshold time; and
   removing one of the callstacks(s) based on the determination that the one of the callstack(s) is missing data.

6. The method of claim 1, further comprising:
   accessing an event identifier for an event type that identifies an asynchronous service call;
   parsing the callstack(s) for respective event identifiers of each of the plurality of services; and
   identifying, based on the parsing, that a certain callstack of the callstack(s) comprises the asynchronous service call.

7. The method of claim 1, further comprising:
   identifying products or services corresponding to the service dataflows, wherein the products implement at least one of the service dataflows; and
   providing a percentage use of each of the plurality of services within the products based on the service dataflows used by each of the products.

8. The method of claim 1, further comprising:
   tracking the service dataflows used by each of products or services indicated by the related transactions, wherein the tracking the service dataflows comprises determining changes in the plurality of services used by the service dataflows for each of the products over time; and
   outputting the changes.

9. The method of claim 1, further comprising:
   comparing at least one of the plurality of services used by each of the service dataflows to an expected service dataflow for the each of the service dataflows;
   determining a difference in services based on the comparing; and
   indicating a certain service of the plurality of services as a candidate for removal from usage based on the difference.

10. A device, comprising:
    a non-transitory memory storing instructions; and
    a processor configured to execute the instructions to cause the device to:
    determine a first mapping of callstack data for a first execution of a transaction, the first mapping indicating a first service dataflow through a first instance of a callstack, the first service dataflow indicating a plurality of services called during the first execution of the transaction, the first instance of the callstack indicating a first plurality of Application Programming Interfaces (APIs) corresponding to the plurality of services;

determine a second mapping of callstack data for a second execution of the transaction, the second mapping indicating a second service dataflow through a second instance of the callstack, the second service dataflow indicating a second plurality of services called during the second execution of the transaction, the second first instance of the callstack indicating a second plurality of APIs corresponding to the second plurality of services; and determine, based on the first and second mappings of the callstack data, one or more characteristics of processing of the transaction as related to the plurality of services.

11. The device of claim 10, wherein the one or more characteristics comprise a flow pattern for the plurality of services.

12. The device of claim 10, wherein the one or more characteristics comprise a usage rate of the plurality of services by an originating entity that originated the transaction, wherein the usage rate is determined based on use of the first and second service dataflow by the originating entity.

13. The device of claim 10, wherein executing the instructions further causes the device to,
determine one of the services exceeding a threshold usage rate for a region based on the usage rate of the services; and
notify a system administrator of the one of the services exceeding the threshold usage rate.

14. The device of claim 10, wherein executing the instructions further causes the device to,
identify products or services corresponding to the first and second service dataflows, wherein the products implement at least one of the first and second service dataflows; and
provide a percentage use of each of the plurality of services within the products based on the first and second service dataflows used by each of the products.

15. The device of claim 10, wherein executing the instructions further causes the device to,
track the first and second service dataflows used by each of products or services indicated by the transaction, wherein the tracking the first and second service dataflows comprises determining changes in the plurality of services used by the first and second service dataflows for each of the products over time; and
outputting the changes.

16. A service provider system comprising:
a non-transitory memory storing instructions; and
one or more hardware processors coupled to the non-transitory memory and configured to read the instructions from the non-transitory memory to cause the service provider system to perform operations comprising:

determining correlation identifiers (IDs) for each respective transaction of a group of related transactions provided by a payment service provider, each of the correlation IDs corresponding to a respective unique transaction of the group of the related transactions, each of the transactions initiated by a respective customer device;

determining, based on the correlation IDs, mappings of callstack data for first executions of the group of the related transactions, the mappings indicating service dataflows through one or more callstack(s), the callstack data indicating a plurality of Application Programming Interfaces (APIs) used to invoke a plurality of services at the payment service provider;

determining, based on the service dataflows and the related transactions, the plurality of services invoked when processing transactions at the payment service provider; and determining, based on the mappings of the callstack data, one or more characteristics of processing of the group of the related transactions at the payment service provider.

17. The service provider system of claim 16, wherein each of the correlation IDs issued to the transaction for a corresponding one of the callstack(s) when the corresponding one of the callstack(s) is detected as initiating the transaction with the payment service provider, and wherein the correlation identifier enables tracking of the corresponding one of the callstack(s) until completion of the transaction.

18. The service provider system of claim 16, wherein the operations further comprise:
filtering, based on a metadata parameter within the callstack(s), the service dataflows through a selected API of the plurality of APIs; and
determining a difference in use of the plurality of services by a first portion of the service dataflows and a second portion of the service dataflows through the selected API based on the filtering.

19. The service provider system of claim 18, wherein the operations further comprise:
outputting at least two sample callstacks based on the first portion and the second portion, wherein the at least two sample callstacks identifies the difference in the use of the plurality of services by the first portion and the second portion.

20. The service provider system of claim 16, wherein the operations further comprise:
tracking the service dataflows used by each of each of products or services indicated by the related transactions, wherein the tracking the service dataflows comprises determining changes in the plurality of services used by the service dataflows for each of the products over time; and
outputting the changes.

* * * * *